United States Patent [19]
Weon et al.

[11] Patent Number: 5,216,633
[45] Date of Patent: Jun. 1, 1993

[54] NONVOLATILE SEMICONDUCTOR MEMORY DEVICE INCLUDING ACCESS CODE CIRCUITRY

[75] Inventors: Dae-sik Weon; Jun-sik Hwangbo, both of Seoul; Jae-young Do, Suwon, all of Rep. of Korea

[73] Assignee: Samsung Electronics Co., Ltd., Kyunggi, Rep. of Korea

[21] Appl. No.: 694,499

[22] Filed: May 2, 1991

[30] Foreign Application Priority Data

Nov. 30, 1990 [KR] Rep. of Korea .................... 90-19568

[51] Int. Cl.⁵ .................... G11C 7/00; G11C 11/40
[52] U.S. Cl. .................... 365/189.07; 340/825.31; 365/189.12; 365/195
[58] Field of Search .................... 365/189.01, 189.07, 365/189.12, 195; 380/4, 23, 25; 395/425; 340/825.31, 825.34

[56] References Cited

U.S. PATENT DOCUMENTS

4,864,542 9/1989 Oshima et al. .................... 365/189.01

*Primary Examiner*—Siegfried H. Grimm
*Attorney, Agent, or Firm*—Rothwell, Figg, Ernst & Kurz

[57] ABSTRACT

In a nonvolatile semiconductor memory device having a plurality of word lines, bit lines, sense lines, nonvolatile semiconductor memory cells, column selecting transistors, a page buffer circuit, data lines, an input driver/sense amplifier, an input buffer an input/output register and a comparator, a secret access code is defined in such a manner that a first secret access code is latched in the page buffer circuit, a second secret access code inputted by the input buffer is compared with the first secret access code read by the input/output register by bytes in the comparator, and if the first and second access codes match, the first secret access code latched in the page buffer is written in the cells of the row line designated in advance among the nonvolatile memory cells.

5 Claims, 4 Drawing Sheets

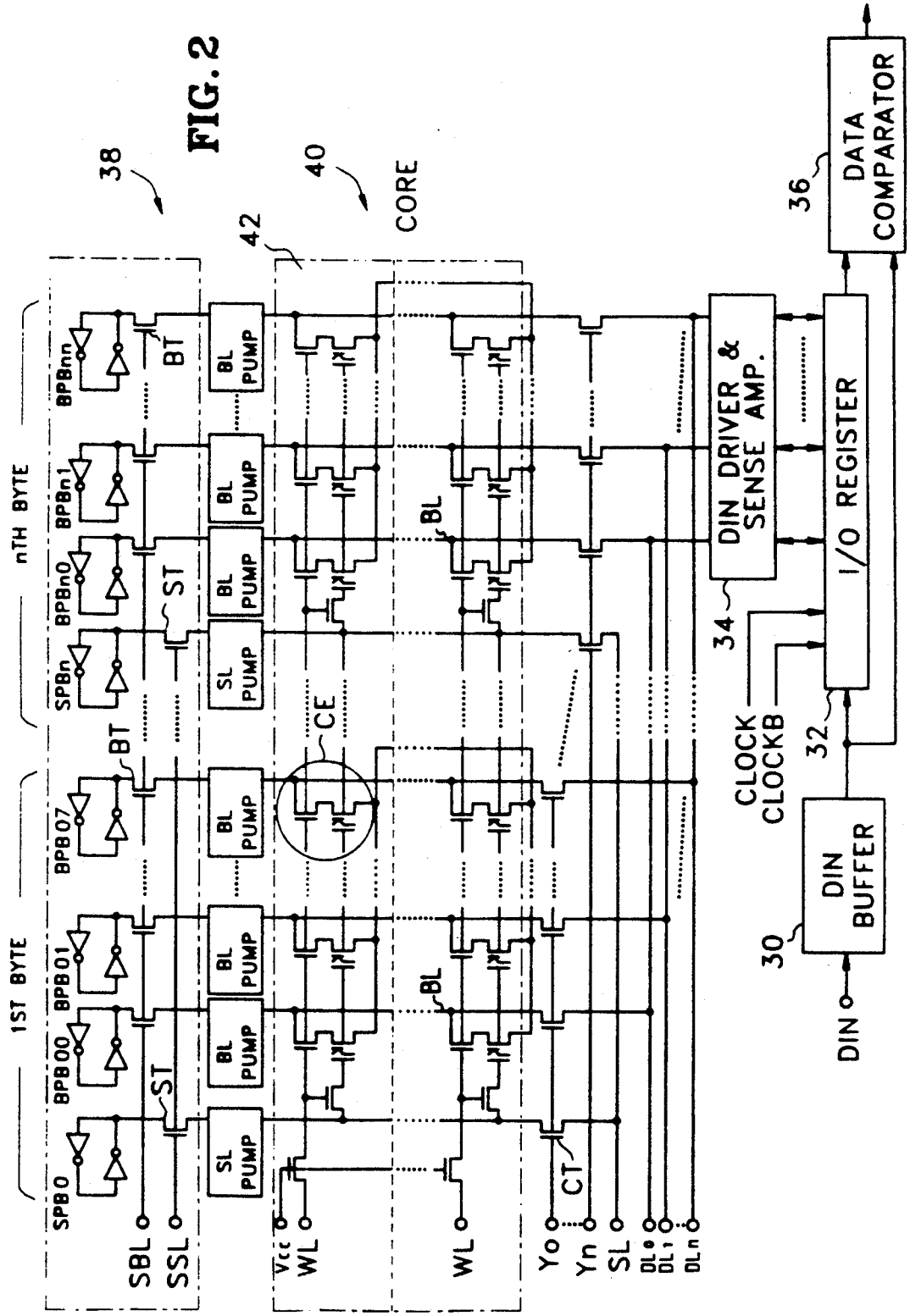

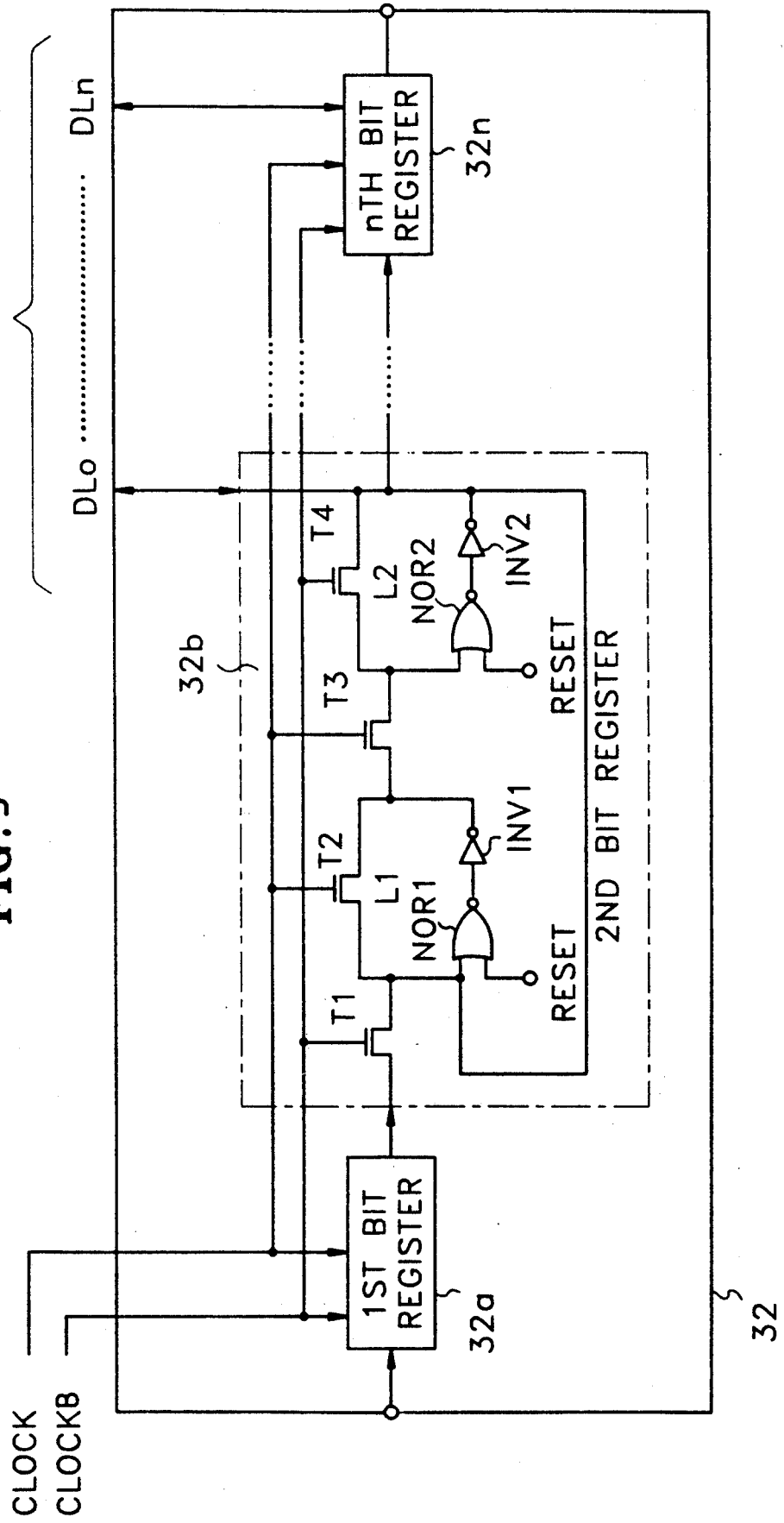

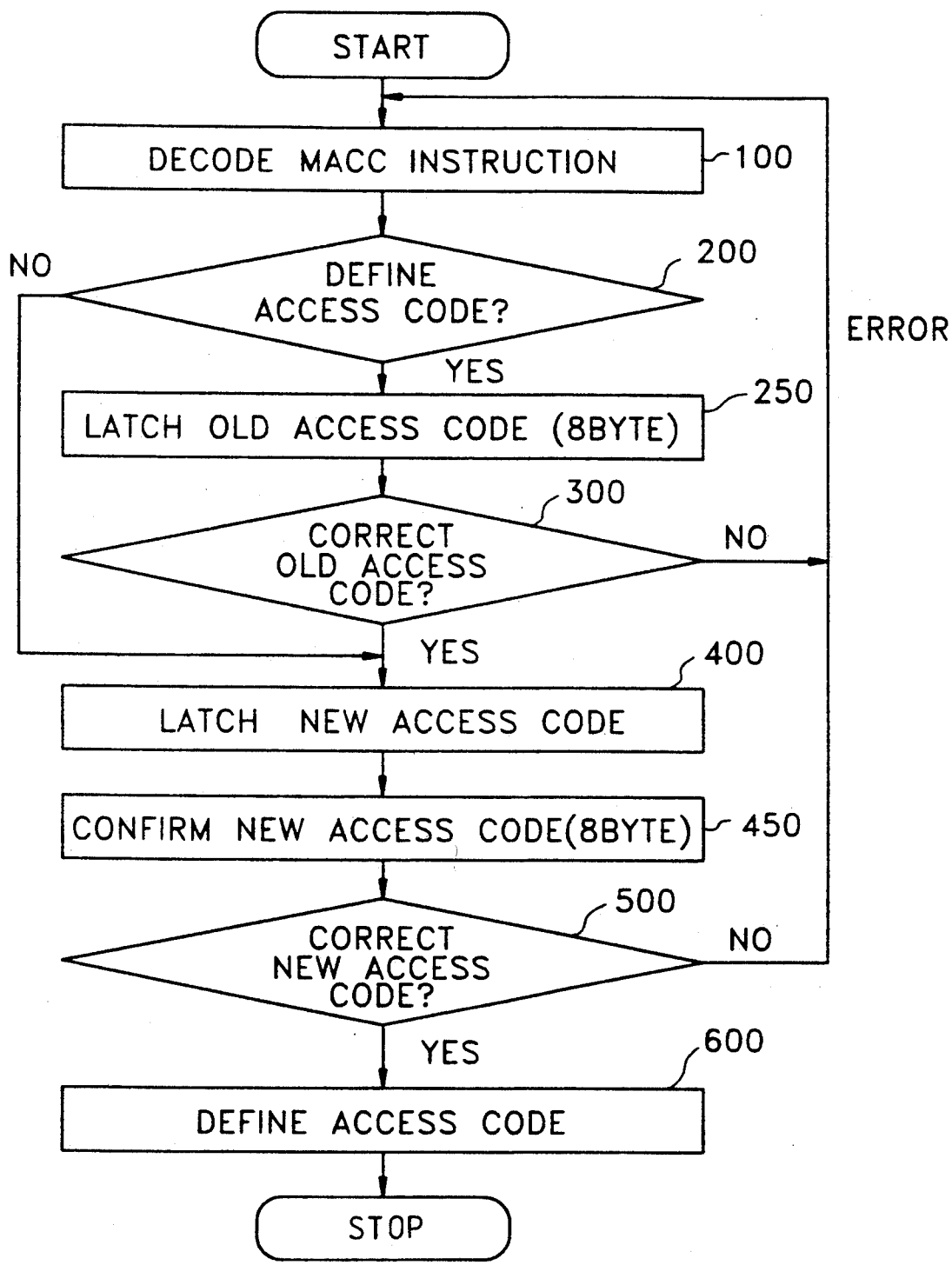

NONVOLATILE SEMICONDUCTOR MEMORY DEVICE INCLUDING ACCESS CODE CIRCUITRY

FIELD OF THE INVENTION

The present invention relates to a nonvolatile semiconductor memory device, particularly to a nonvolatile semiconductor memory device having a reduced chip size by simplifying circuits of an Electrically Erasable Programmable Read Only Memory (EEPROM) device.

BACKGROUND OF THE INVENTION

As semiconductor memory devices have recently become more integrated and varied, IC cards using EEPROM devices have accordingly become widely employed. The IC cards have secrecy, security, and data processing and management functions superior to magnetic cards and so their applied fields are spreading rapidly. In the past, two chips, namely microcomputer and EEPROM chips, were used in IC cards. Now, products having microcomputers and EEPROMs in a single chip are being produced and products adding functions necessary in the applied fields and reducing fabrication cost are being studied.

Usually, to preserve secrecy, EEPROMs used in IC cards are able to store a specific secret access code entered by the user and the secret access code needs to be entered twice in order to prevent errors from occurring when the secret access code is entered or changed. Accordingly, the conventional EEPROM as shown in FIG. 1 comprises a data input buffer 10 connected to an input terminal Din, two registers 12 and 14, a comparator 16, a memory cell array 18 and extra cells 20 in which to store the secret access code. In the conventional EEPROM, to initially define the secret access code, the secret access code is inputted twice in series via the data input buffer 10 with the first secret access code going into A register 12 and the second into B register 14. The comparator 16 compares the secret access codes inputted into A register 12 and B register 14. If the secret access codes do not match, an error signal is produced and if they do, a security mode is defined by writing the inputted secret access code in the extra cells 20. After the security mode is defined, if the inputted secret access code and a previously stored secret access code match, an authorized user is recognized and the next instruction can be performed. If the codes do not match, an error signal is produced recognizing an unauthorized user.

Meanwhile, the defined secret access code is changed by the following process. A previously defined secret access code that is already stored in extra cells 20, is inputted into A register 12. Also, the old secret access code entered by the user, is inputted into B register 14 via data input buffer 10. Then, the secret access codes in A and B registers 12 and 14 are compared in comparator 16. If the codes do not match, an error signal is generated and if the codes match, the user can define a new access code. A new access code entered by the user is then inputted into A register 12 and the new access code is again inputted into B register 14 for confirmation. After that, the new access codes are compared in comparator 16. If they do not match, an error signal is generated and if the codes match, definition of the new access code is completed.

As described above, the chip is overly large and when the secret access code is written or changed, the signal control is overly complex because the conventional EEPROM comprises two registers or a latch for comparing the two secret access codes and extra cells 20, provided inside an EEPROM chip, for writing the secret access code in addition to memory cell array 18.

SUMMARY OF THE INVENTION

Therefore, it is an object of the present invention to provide a nonvolatile semiconductor memory device which can have a reduced chip size by eliminating the extra cells, provided in addition to a memory cell array, for writing a secret access code and by eliminating one of two registers necessary for comparing secret access codes in an EEPROM.

In achieving the above object of the present invention, there is provided a nonvolatile semiconductor memory which comprises:

a plurality of word lines extending in the row direction;

a plurality of bit lines extending in the column direction, intersecting the word lines;

a plurality of sense lines each respectively extending for each byte of the bit lines in the column direction;

a plurality of nonvolatile semiconductor memory cells disposed at every intersection of the word lines and the bit lines and sectioned to each block by the sense lines;

page buffer means consisting of a plurality of page buffers connected to the plurality of bit lines and the plurality of sense lines;

a plurality of column selecting transistors connected to the sense lines and also to the ends of the bit lines and the data lines, and simultaneously turned on by bytes;

a plurality of data lines connected the plurality of bit lines through the column selecting transistors;

a data input driver/sense amplifier for driving in parallel, input data into the data lines and for outputting in parallel the cell data loaded on the data lines by sensing and amplifying the cell data;

input buffer means for buffering serial input data applied to an input terminal;

an input/output register for inputting in series the input data buffered by the input buffer means, transferring data in parallel with the data input driver/sense amplifier and outputting data in series; and a comparator for comparing the serial input data buffered by the input buffer means with the serial output data of the input/output register characterized in that the secret access code is defined in such a manner that a first secret access code is latched in the page buffer means, a second secret access code inputted by the input buffer means is compared with the first secret access code read by the input/output register by bytes in the comparator, and if the first and second access codes match, the first secret access code latched in the page buffer means is written in cells of the row line designated in advance among the nonvolatile memory cells.

BRIEF DESCRIPTION OF THE DRAWINGS

The above object and other advantages of the present invention will become more apparent by describing in detail the preferred embodiment of the present invention with reference to the attached drawings in which:

FIG. 2 illustrates the comparing operation of secret access codes in EEPROMs according to the present invention;

FIG. 3 is a circuit diagram of a preferred embodiment of I/O register 32 in FIG. 2;

FIG. 4 is a flowchart of a program for performing instructions to define the secret access codes in EEPROMs according to the present invention.

DETAILED DESCRIPTION OF THE INVENTION

Figure 1:
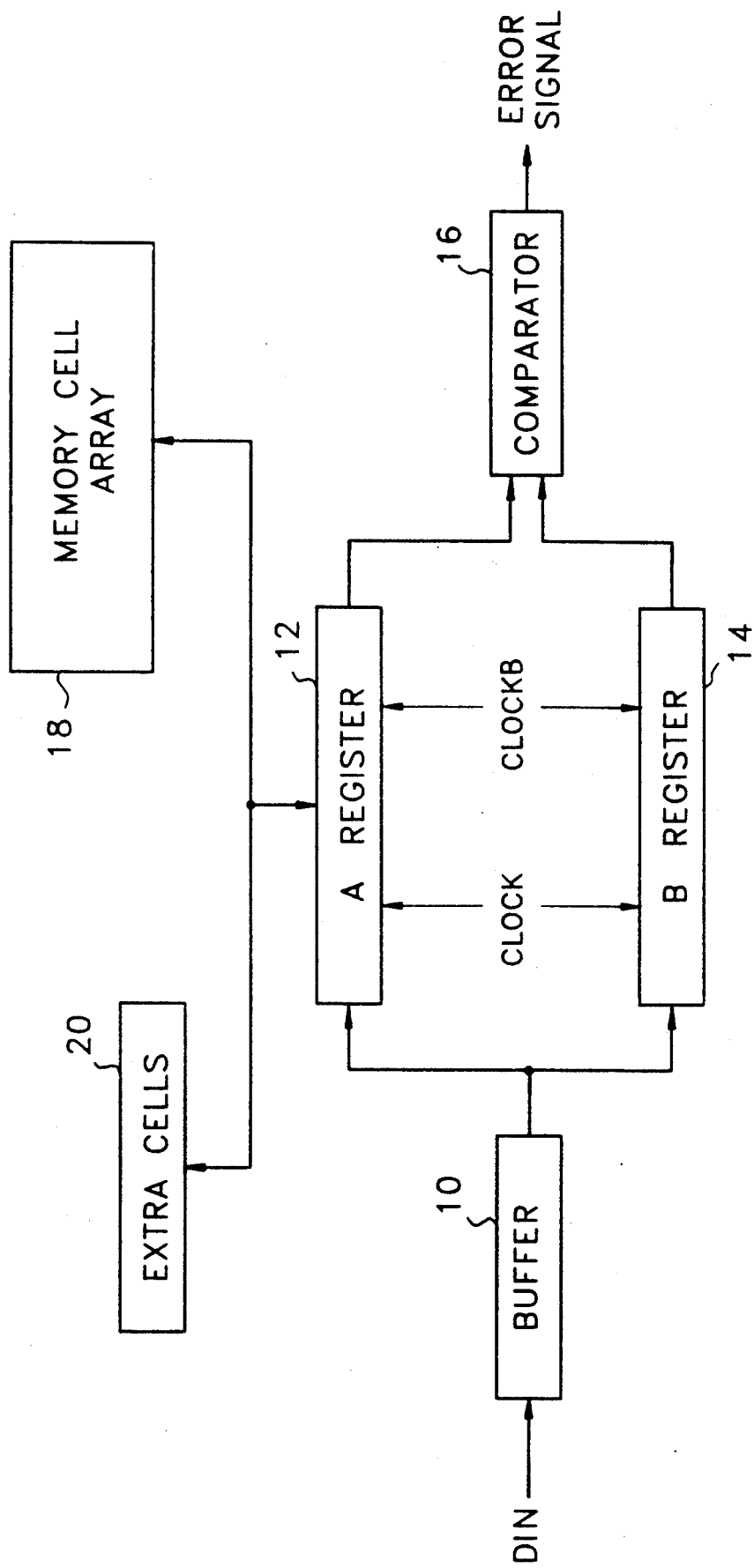
FIG. 1 is a block diagram which illustrates the comparing operation of secret access codes in a conventional EEPROM.

Referring to FIG. 2, an EEPROM of the present invention comprises a plurality of word lines WL, bit lines BL, sense lines SL, a memory cell array 40 composed of a plurality of EEPROM cells CE, a page buffer circuit 38, column selecting transistors CT, data lines $DL_0$ to $DL_n$, an input driver/sense amplifier 34, an input buffer 30, an input/output register 32 and a comparator 36. The word lines WL are selected by a row decoder (not shown) and the bit lines BL by column selecting signals $Y_0$ to $Y_n$ of a column decoder (not shown).

In the page buffer circuit 38, a plurality of buffers are connected to the plurality of bit lines BL and the plurality of sense lines SL through respective transistors BT and ST. Transistors BT are switched by a select bit line signal SBL and transistors ST are switched by a select sense line signal SSL. The column selecting transistors CT are connected to the sense line SL and also the ends of the bit lines BL and the data lines DL, column selecting transistors CT for each byte are simultaneously turned on by signals $Y_0$-$Y_n$ (eight transistors). The bit lines are connected to the data lines $DL_0$ to $DL_n$ through the column selecting transistors CT. The input driver/sense amplifier 34 drives input data in parallel into the data lines and outputs in parallel the cell data loaded on the data lines $DL_0$-$DL_n$ by sensing and amplifying the cell data. The input buffer 30 buffers the serial input data applied to input terminal Din. The input/output register 32 inputs in series the serial input data buffered by the input buffer 30, transfers data in parallel with the input driver/sense amplifier 34, and supplies the serial data to an input terminal of the comparator 36. The comparator 36 compares the serial output data of the input/output register 32 with the serial input data buffered by the input buffer 30. A cell connected to one word line among the memory cell array 40 is used as an exclusive cell for writing the secret access code. The exclusive cell may be a dummy cell.

In the input/output register 32 as shown in FIG. 3, a first register 32a through nth register 32n are serially connected to each other and the first register 32a is used for storing the parity bit and the second register 32b through the nth register 32n are used for storing data bits. Every register has an input-side transistor T1 whose gate is supplied with an inverted clock signal CLOCKB, an input-side latch L1, a link transistor T3 whose gate is supplied with a clock signal CLOCK and an output-side latch L2. The input-side latch L1 consists of a feedback transistor T2 switched by the clock signal CLOCK, a NOR gate NOR1 and an inverter INV1 connected between the source and drain of the feedback transistor T2. The output-side latch L2 having the same construction, consists of a feedback transistor T4 supplied with the inverted clock signal CLOCKB, a NOR gate NOR2 and an inverter INV2. The input-side latch L1 is supplied with the cell data through a data line DLo and the output-side latch L2 is connected to the data line DLo to supply the input data back to the data line DLo. The chip size of an EEPROM of the present invention can be reduced as compared with the conventional devices by replacing an extra memory cell for writing the secret access code with the exclusive cell line 42 of the memory cell array 40, eliminating one of two input/output registers, and substituting the page buffer 38 for the eliminated register. In more detail, according to the present invention, the first secret access code is latched in the page buffer 38, the latched first secret access code is read out byte by byte into the input/output register 32 and is compared with the second secret access code inputted through the input buffer 30 in the comparator 36, and if the first and second access codes match, the first secret access code latched in the page buffer 38 is written into the exclusive cell 42 so that the secret access code is defined and if the first and second access codes do not match, an error signal is produced.

Referring to FIG. 4, a program for defining the secrecy mode is explained as follows.

The secret access code is composed of 8 bytes and is stored in the exclusive cell 42 of the memory cell array 40. A MACC (modify access code) instruction is set in order to prevent the alteration of the secret access code by an unauthorized user and execution of the MACC instruction requires a code input of three steps. If the MACC instruction is inputted, the EEPROM decodes the instruction code (step 100) and the EEPROM is converted to MACC mode. Then, if a secret access code has been defined (step 200), the exclusive cell line 42 is selected among the memory cell array 40 to read data of byte "0" and to input them into the input/output register 32. The data of the old secret access code read out to the input/output register 32 is compared bit by bit with data input via the input buffer 30 in the comparator 36. The old secret access code of n bytes is compared with the inputted secret access code for the remaining bytes in the same way as described above (step 250). If the codes match (step 300), the first new access code entered by the user is latched in the page buffer 38 via data input buffer 30 and input/output register 32 (step 400). Then, the new access code is inputted again for confirmation the data latched in the page buffer 38 is applied to the input/output register 32 by sensing and amplifying the data through the input driver/sense amplifier 34, and the read access codes and inputted access codes are compared bit-by-bit in the comparator 36 in the same manner as described above (step 450). If they match (step 500), the new access code is written in the exclusive cells 42 to be defined as new access code (step 600). If the codes match during step 300, they are dealt with in step 400 and if they are not identical during steps 300 and 500, the comparator 36 produces an error to stop system operation.

The present invention thus compares two secret access codes using the page buffer 38 and writes the secret access code in the exclusive cells connected to one word line in the EEPROM performing page mode in which data is written by bytes so that the chip size can be reduced as compared with the conventional EEPROM. Thus, the present invention is more economical than the conventional devices.

What is claimed is:

1. A nonvolatile semiconductor memory device storing an access code for access to said device, comprising:
   a plurality of word lines extending in a first direction;

a plurality of bit lines extending in a second direction perpendicular to and intersecting said word lines;

a plurality of nonvolatile semiconductor memory cells disposed at each intersection of said word lines and bit lines and connected therebetween for storing bits of data in said semiconductor memory cells;

means for selecting predetermined groups of semiconductor memory cells in said first direction in units of bytes through said bit lines;

a plurality of data lines connected to said plurality of bit lines through said means for selecting;

data input/sensing means for inputting data to said semiconductor memory cells through said data lines and said bit lines and for outputting data from said data lines;

page buffer means connected to said plurality of bit lines for temporarily latching access code data from said data input/sensing means;

input data buffer means for inputting serial data from an input terminal;

an input/output register for reading serial data from said input data buffer means, transferring data in parallel with said data input/sensing means, and outputting serial data at an output terminal thereof; and a comparator for comparing serial access code data from said input data buffer means with serial access code data at said output terminal of said input/output register;

said access code being defined by first inputting said access code from said input data buffer means through said input/output register and said data input/sensing means and latching said access code in said page buffer means, inputting said access code again from said input data buffer means to said input/output register, said access code latched in said page buffer means being compared with the access code in said input/output register by said comparator and written into semiconductor memory cells of a predetermined word line upon matching therewith.

2. A nonvolatile semiconductor memory device as claimed in claim 1, wherein said page buffer means comprises buffers connected to bit lines respectively via transistors switched by a bit line selecting signal and buffers connected to sense lines provided in said second direction for each byte of data memory cells respectively via transistors switched by a sense selecting signal.

3. A nonvolatile semiconductor memory device as claimed in claim 1, wherein said memory cells of the predetermined word line in which said access code is written are dummy cells.

4. A nonvolatile semiconductor memory device as claimed in claim 1, wherein said nonvolatile memory cells are electrically erasable programmable read only memory cells.

5. A nonvolatile semiconductor memory device as claimed in claim 1, wherein said access code inputted to said input/output register is a confirmation for said first access code latched in said page buffer means.

* * * * *